United States Patent
Hooker

(10) Patent No.: US 11,272,347 B2
(45) Date of Patent: *Mar. 8, 2022

(54) MODERNIZED MESSAGING COMPATIBILITY WITH INTERIM TEXT-TO-911

(71) Applicant: T-Mobile USA, Inc., Bellevue, WA (US)

(72) Inventor: William Michael Hooker, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/068,777

(22) Filed: Oct. 12, 2020

(65) Prior Publication Data

US 2021/0058762 A1    Feb. 25, 2021

Related U.S. Application Data

(63) Continuation of application No. 16/544,854, filed on Aug. 19, 2019, now Pat. No. 10,873,845.

(51) Int. Cl.
| | | |
|---|---|---|
| *H04L 29/06* | (2006.01) | |
| *H04M 3/51* | (2006.01) | |
| *H04M 3/42* | (2006.01) | |
| *H04W 4/90* | (2018.01) | |
| *H04W 4/14* | (2009.01) | |
| *H04L 65/1016* | (2022.01) | |

(52) U.S. Cl.
CPC .......... *H04W 4/90* (2018.02); *H04L 65/1016* (2013.01); *H04M 3/5116* (2013.01); *H04W 4/14* (2013.01); *H04M 2242/04* (2013.01)

(58) Field of Classification Search
CPC ...... H04W 4/90; H04W 4/14; H04L 65/1016; H04M 3/5116; H04M 2242/04; H04M 3/42382

See application file for complete search history.

(56) References Cited

U.S. PATENT DOCUMENTS

| | | | | |
|---|---|---|---|---|
| 10,873,845 B1* | 12/2020 | Hooker | ............ | H04M 3/42382 |
| 2014/0287714 A1* | 9/2014 | Marshall | ............... | H04W 4/12 |
| | | | | 455/404.2 |
| 2016/0249193 A1* | 8/2016 | Edge | .................... | H04L 67/125 |

* cited by examiner

*Primary Examiner* — Joseph E Dean, Jr.
(74) *Attorney, Agent, or Firm* — Perkins Coie LLP

(57) ABSTRACT

Systems and methods are described herein for handling a request for a text message session on an IP multimedia subsystem (IMS) capable network. For example, a device is communicatively coupled at a location of the IMS capable network. The method includes receiving a request from the device for a text message session on the IMS capable network and determining whether the IMS capable network supports next generation 911 (NG911) or interim text-to-911 at the location of the device. Upon determining that the IMS capable network is incapable of supporting NG911, redirecting the request for the text message session to a text control center (TCC). The method further includes causing the TCC to establish the text message session with a public safety answering point (PSAP) that supports text-to-911.

20 Claims, 4 Drawing Sheets

MODERNIZED MESSAGING COMPATIBILITY WITH INTERIM TEXT-TO-911

CROSS REFERENCE TO RELATED APPLICATIONS

This application is a continuation of U.S. patent application Ser. No. 16/544,854, filed on Aug. 19, 2019, entitled MODERNIZED MESSAGING COMPATIBILITY WITH INTERIM TEXT-TO-911, which is hereby incorporated by reference in its entirety.

BACKGROUND

Enhanced 911 (E911) is a system to automatically provide a caller's location to 911 dispatchers. An incoming 911 call is routed to a public safety answering point (PSAP), which is a call center operated by a local government. At the PSAP, the call is answered by a 911 dispatcher. The dispatcher's computer uses information provided by the telecommunications carrier to obtain the location (e.g., physical address or geographic coordinates) of the caller. This information is then used to dispatch police, fire, medical, or other services.

Next Generation 911 (NG911) refers to an initiative aimed at updating the 911 service infrastructure to improve public emergency communications services in a growingly wireless mobile society. It intends to support text, images, video, and data to PSAPs. Because most 911 systems were built using analog rather than digital technologies, PSAPs across the country need to be upgraded to a digital or IP-based 911 system. Hence, PSAPs must transition from the legacy PSTN-based architecture to the NG911 architecture that can support end-to-end IP signaling and have native support for new media types such as real-time text (RTT) and message session relay protocol (MSRP) messaging. Multimedia emergency services (MMES) are achieved by supporting all these forms of media on the same signaling path.

IP multimedia subsystem (IMS) emergency procedures to support emergency communications, originating from an IMS subscriber and terminating at an NG911 system are specified in ATIS-0700015 ("ATIS Standard for Implementation of 3GPP Common IMS Emergency Procedures for IMS Origination and ESInet/Legacy Selective Router Termination").

Interim text-to-911 refers to the ability to send a text message from a device to reach 911 emergency services. For example, a short message service (SMS) text service can be used to message 911 emergency services. Text-to-911 is supported by using an interim solution that leverages SMS page mode to a text control center (TCC). When the TCC receives a text message, it obtains the location of the originating device from a location server (LS). The TCC uses that location to obtain routing instructions from a routing server (RS). Then, the TCC converts the text message to a suitable protocol for a PSAP. For example, the TCC can interwork the text message to a variety of session-based solutions (e.g., TTY, HTTP, MSRP) at a PSAP. Interim text-to-911 is specified in ATIS J-STD-110.01.v002 ("Joint ATIS/TIA Native SMS/MMS Text to 9-1-1 Requirements and Architecture Specification Release 2").

BRIEF DESCRIPTION OF THE DRAWINGS

Embodiments of the present technology will be described and explained through the use of the accompanying drawings.

Figure 1:
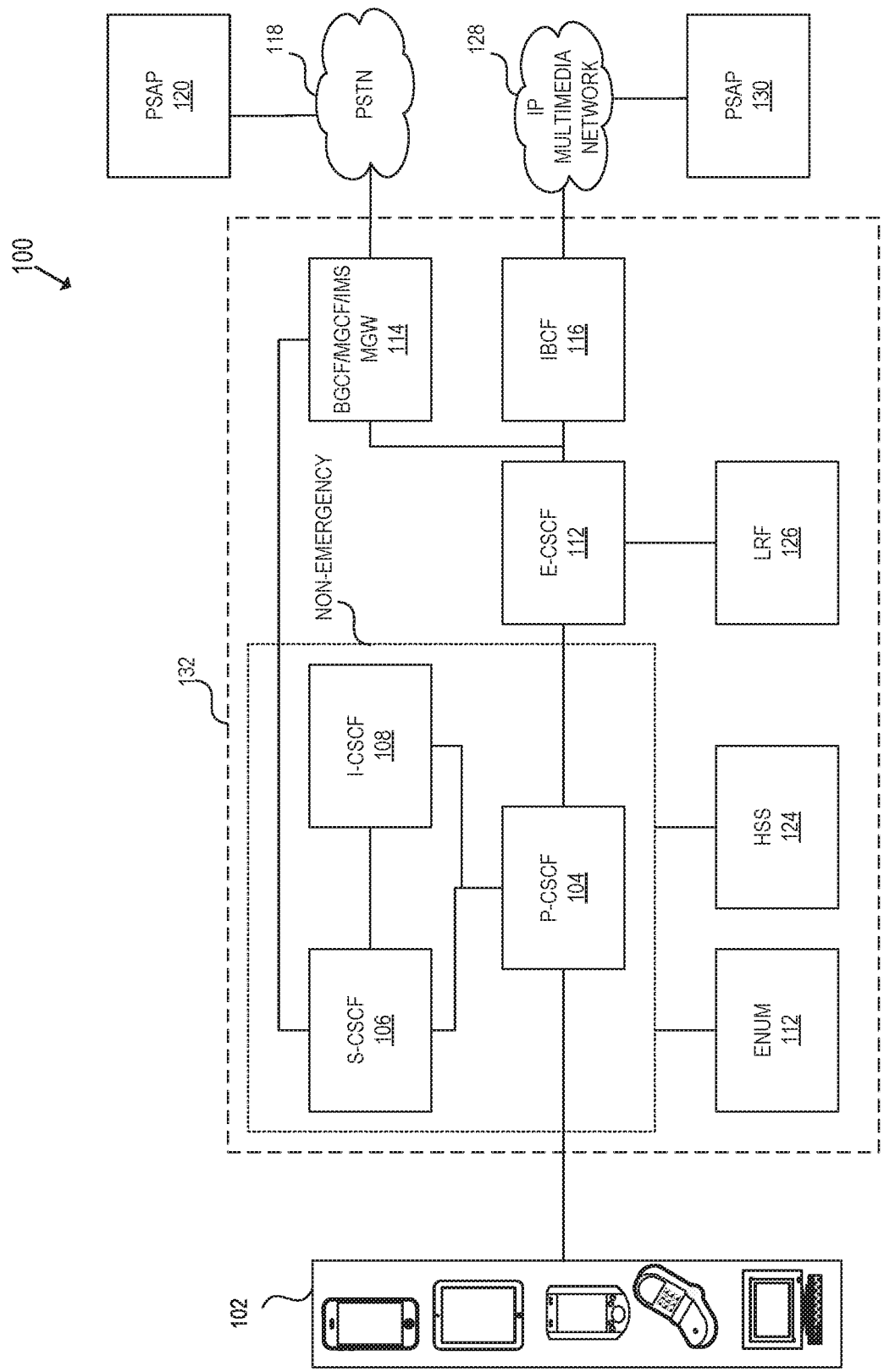
FIG. 1 is a block diagram that illustrates an IP multimedia subsystem (IMS) environment for routing emergency calls to public safety answering points (PSAPs).

The drawings, some components and/or operations can be separated into different blocks or combined into a single block when discussing some embodiments of the present technology. Moreover, while the technology is amenable to various modifications and alternative forms, specific embodiments have been shown by way of example in the drawings and are described in detail below. The intention, however, is not to limit the technology to the particular embodiments described herein. On the contrary, the technology is intended to cover all modifications, equivalents, and alternatives falling within the scope of the technology as defined by the appended claims.

DETAILED DESCRIPTION

In Next Generation 911 (NG911), a text message session is handled like an emergency call. That is, an emergency text session can be established in manner similar to that described below with reference to FIG. 1. However, emergency communications systems do not all have the same NG911 capabilities, particularly with respect to reliable handling of emergency text messaging. Despite the broad unavailability to connect a text session to an NG911 capable public safety answering point (PSAP), the overwhelming implementation of text messaging technologies has led many mobile users to assume text messaging can be used to initiate emergency communications requests.

Accordingly, the major carriers in the US support an interim text-to-911 solution. In doing so, the solution did not require any substantial new development because it uses an existing non-emergency text solution. To make this work, carriers integrated their messaging platforms to text control centers (TCCs) to send text-to-911 attempts to emergency services. The TCCs communicate with the carriers to determine which emergency jurisdiction should receive a text message session. For example, the TCC can obtain location information by using networks carrier's existing commercial location-based services of network carriers and identify a PSAP that supports the requested communication. As such, the TCC can connect a device to a PSAP suitable for handling an emergency request in a chat-like session. If the PSAP does not support text-to-911, a bounce back message is returned to the user in order to prompt the user to call 911. This is often referred to as an interim text-to-911 solution because it reuses existing technology.

Systems and methods described herein provide a solution for devices to access NG911 emergency services while still being backwards compatible with interim text-to-911 systems. In general, devices on communications networks are not aware whether an accessible serving PSAP supports NG911. The disclosed embodiments allow NG911 messaging for devices while also enabling backwards compatibility with interim text-to-911 systems. Thus, devices can establish text message sessions on networks that are capable of supporting NG911 or, as a fallback, on networks that are incapable of supporting NG911 but are capable of supporting text-to-911.

In some embodiments, an IP multimedia subsystem (IMS) network has an emergency call routing function that can support backwards compatibility in instances where devices support message session relay protocol (MSRP). As described in greater detail below, the call routing function is handled by a location retrieval function (LRF), routing determination function (RDF), or gateway mobile location center (GMLC). The GMLC is a control plane system that interfaces with emergency customers and the operator's network to provide the location of a device. The LRF retrieves location information for users that have initiated an emergency session. The RDF provides the allocated outgoing address to an emergency call session call function (E-CSCF) for routing an emergency request to a PSAP.

When the call routing function receives a request for an incoming text message session, a check is performed to determine whether the network supports NG911. Specifically, the call routing function can determine whether a network supports text over IP at the device's location on the network. The location of the device is obtained from the device and/or obtained from the network. Depending on the capabilities of the device and the capabilities of the network where the device is located, the call routing function can assign a location to the text message session by reference identifier and route the text session to a NG911 destination or fallback to text-to-911 by returning an error message (e.g., SIP 380 Alternative Services) to the device, or route the text message session to a TCC that accepts a MSRP request (without assigning emergency services routing keys (ES-RKs), without referencing identifiers, or without maintaining a call state).

Various embodiments of the disclosed systems and methods are described. The following description provides specific details for a thorough understanding and an enabling description of these embodiments. One skilled in the art will understand, however, that the invention can be practiced without many of these details. Additionally, some well-known structures or functions may not be shown or described in detail for the sake of brevity. The terminology used in the description presented below is intended to be interpreted in its broadest reasonable manner, even though it is being used in conjunction with a detailed description of certain specific embodiments of the invention.

Although not required, embodiments are described below in the general context of computer-executable instructions, such as routines executed by a general-purpose data processing device, e.g., a networked server computer, mobile device, or personal computer. Those skilled in the relevant art will appreciate that the invention can be practiced with other communications, data processing, or computer system configurations, including: Internet appliances, handheld devices, wearable computers, all manner of cellular or mobile phones, multi-processor systems, microprocessor-based or programmable consumer electronics, set-top boxes, network PCs, mini-computers, mainframe computers, media players and the like. Indeed, the terms "computer," "server," and the like are generally used interchangeably herein, and refer to any of the above devices and systems, as well as any data processor.

While aspects of the disclosed embodiments, such as certain functions, can be performed exclusively or primarily on a single device, some embodiments can also be practiced in distributed environments where functions or modules are shared among disparate processing devices, which are linked through a communications network, such as a Local Area Network (LAN), Wide Area Network (WAN), or the Internet. In a distributed computing environment, program modules can be located in both local and remote memory storage devices.

Aspects of the invention can be stored or distributed on tangible computer-readable media, including magnetically or optically readable computer discs, hard-wired or preprogrammed chips (e.g., EEPROM semiconductor chips), nanotechnology memory, biological memory, or other data storage media. In some embodiments, computer implemented instructions, data structures, screen displays, and other data under aspects of the invention can be distributed over the Internet or over other networks (including wireless networks), on a propagated signal on a propagation medium (e.g., an electromagnetic wave(s), a sound wave, etc.) over a period of time, or they can be provided on any analog or digital network (packet switched, circuit switched, or other scheme).

Internet Protocol Multimedia Subsystem (IMS) Environment

An IMS capable network supports emergency services via an IMS functional element known as an emergency call session control function (E-CSCF). The E-CSCF routes emergency call requests to the nearest PSAP via remote end-point functional elements or gateway nodes such as a border gateway control function (BGCF), a media gateway control function (MGCF) or an interconnection border control function (IBCF). Multimedia sessions between these and other IMS functional elements are created and controlled using a client-server signaling protocol known as session initiation protocol (SIP).

FIG. 1 is a diagram of a representative IMS environment 100 for routing emergency calls to PSAPs. The IMS environment 100 includes a user equipment (UE) 102 device for initiating an emergency call. The UE 102 can connect to an IP connectivity access network (IP-CAN) (not shown), which is a collection of network entities and interfaces that provide the underlying IP transport connectivity between the UE 102 and IMS entities. The IMS core is not dependent on any specific type of access network. Thus, the IP-CAN can include, for example, general packet radio service (GPRS), universal mobile telecommunications system (UMTS), long term evolution (LTE), CDMA2000, fixed wireline (e.g., DSL, Ethernet, cable), WiMax, fixed broadband access, wireless local access network (WLAN), or other wired or wireless communications connection.

The UE 102 can include any devices that can connect to the IP-CAN. Some of the devices are IMS capable (i.e., can handle signaling and/or media transport protocols of the IMS core), while others can be non-IMS-capable. For example, the UE 102 can include, but is not limited to: mobile phones, voice over IP (VoIP) devices, personal digital assistants, radio frequency devices, infrared devices, handheld devices, laptop computers, desktop computers, netbooks, wearable computers, tablet devices, media players, gaming device, set-top boxes, and the like.

A call request from the UE 102, which can be a non-emergency request or an emergency request, is received by a proxy call session control function (P-CSCF) 104. The P-CSCF 104 examines the received call request to determine whether the call request is an emergency call request or a non-emergency call request. If the call request is a non-emergency call request, the P-CSCF 104 communicates with the serving call session control function (S-CSCF) 106 and the interrogating call session control function (I-CSCF) 108 to route the call request to a terminating UE in the public switched telephone network (PSTN) 118 or the IP network 128. For example, the call can be routed via an MGCF 114 selected by a BGCF to the PSTN 118. In another example, the call can be routed via an IBCF 116 to the IP network 128. In order to perform the routing, the P-CSCF 110 and/or other IMS entities can use information from the telephone number mapping server (ENUM) 122 and/or home subscriber server (HSS) 124.

When the call request is an emergency call request, the P-CSCF 110 classifies or flags the call request as an emergency call request and selects an E-CSCF 112 in the same network to handle the emergency call request. The E-CSCF 112 communicates with an LRF 126, which retrieves location information for the UE 102, and obtains routing information (e.g., address of the PSAP) for the emergency call from one or more entities supporting location services as the GMLC (not shown).

As described above, the MGCF 114 supports the IMS-PSTN interworking. The IBCF 116 supports interworking with other networks that are more likely to be IP networks 128 than time division multiplexing (TDM) networks such as PSTN 118. The IBCF 116 sits on a session border controller (SBC) (not shown) at the edge of the IMS core. Depending on the details associated with the emergency call request, the emergency call can be routed to the BGCF/MGCF 114 or to the IBCF 116. If the E-CSCF 112 selects an MGCF 114 as the routing node, the MGCF 114 routes the emergency call to a PSAP 120 sitting in the PSTN network 118. Similarly, if the E-CSCF 112 selects the IBCF 116 as the routing node, the IBCF 116 routes the emergency call to a PSAP 130 in the IP network 128. The S-CSCF 106, the I-CSCF 108, the P-CSCF 110, the E-CSCF 112, the BGCF/MGCF 114, IBCF 116, ENUM 122, HSS 124 and LRF 126 can be considered IMS entities (or nodes) of an IMS core 132.

In one example, the UE 102 initiates an emergency call request. The emergency call request is for establishing an emergency call with and to an appropriate PSAP, and for delivering location information associated with the subscriber's UE 102 to the PSAP. The location information can be acquired via one or more procedures. For example, the UE 102 can determine its own location or location identifier with or without the assistance of the IP-CAN. Various location determining methods are possible.

The LRF 126 can use procedures defined in 3GPP TS 23.271 for control plane location or procedures defined by the Open Mobile Alliance (OMA) for secure user plane location (SUPL) to determine the location of the UE 102. The LRF 126 can also determine an address for a PSAP selected for the emergency call via the GMLC or by invoking an RDF to convert the location of the UE 102 into a PSAP address. In one example, the LRF 126 stores some or all the information obtained, received and/or associated with the UE 102 and the emergency call request in a record. The LRF 126 can send the location information (UE location) and/or the routing information (PSAP address) 226 to the E-CSCF 112. In addition to the location and/or routing information, the LRF 126 can also send correlation information to the E-CSCF 112. The correlation information identifies the record for the emergency call stored in the LRF 126 and can be used by the PSAP as a key to later request the UE's location information from the LRF 126.

The correlation information can include an emergency services routing reference identifier. For example, a reference identifier can be a 10-digit routable, but not necessarily dialable, number that can be used to identify the UE 102 and the LRF 126 for the emergency call. For example, each LRF can allocate reference numbers from a different unique range of numbers, which allows the PSAP to determine the LRF based on the number range. The details of the acquiring of location information and/or routing information are described in detail in the 3GPP TS 123.167 technical specification, which is incorporated by reference herein.

Figure 2:
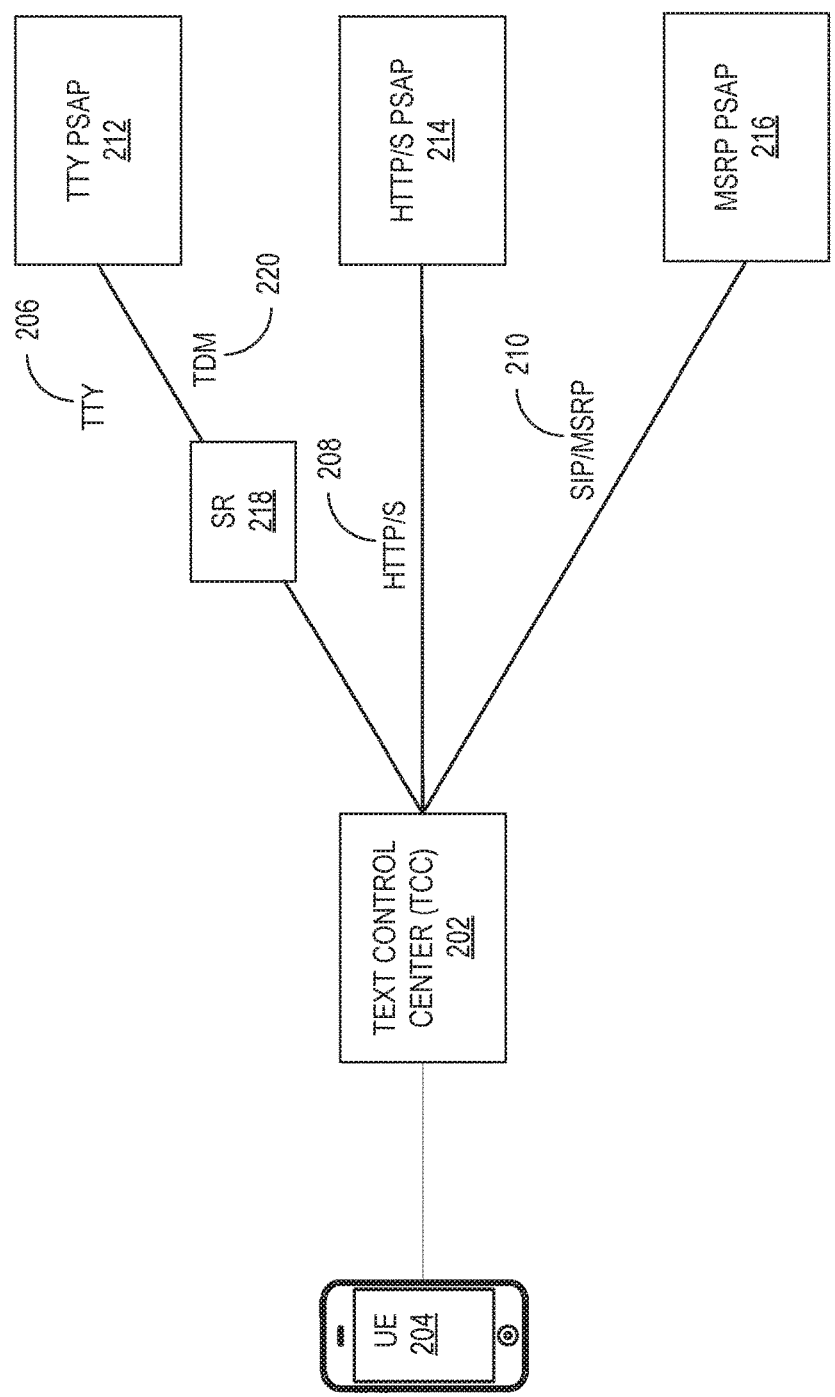
FIG. 2 is a block diagram that illustrates a system that supports an interim text-to-911 emergency service.

FIG. 2 is a block diagram that illustrates a system 200 that supports an interim text-to-911 emergency service. As illustrated, a TCC 202 receives a text-to-911 message in the form of an SMS message from a UE 204. Once received, the TCC 202 retrieves a location for the UE 204 and performs location-based routing based on the retrieved location. The TCC 202 then converts the SMS message to an appropriate delivery protocol (e.g. teletype (TTY) protocol 206, hypertext transfer protocol with secure sockets layer (SSL)/transport layer security (TLS) (HTTP or HTTPS) 208, or session initiation protocol (SIP)/message session relay protocol (MSRP) 210) and delivers the message to a PSAP 212, 214, 216 via one of three available delivery options. The text-to-911 delivery options include: delivery to a TTY PSAP 212, delivery to an HTTP/S PSAP 214 (e.g., an IP-enabled PSAP with a web browser client) 214, or delivery to an MSRP PSAP 216 for forwarding to a PSAP with NG911 technology.

In operation, the TCC 202 routes a text-to-911 message to a TTY terminal on a TTY PSAP 212 by converting the text-to-911 message to a TTY protocol 206 and routing the text-to-911 message through a selective router (SR) 218 to the TTY PSAP 212. The TTY PSAP 212 is connected to the SR 218 via time division multiplexing (TDM) trunks 220. The text-to-TTY delivery is typically unreliable and slow because TTY messages transmitted through the SR 218 connected to TDM trunks 220 are prone to corruption and transmission delay. Moreover, transmitting text-to-911 messages over legacy emergency communication systems via TDM trunks 220 is costly.

In the text to HTTP/S PSAP 214 delivery option, the TCC 202 converts an SMS-originated request to HTTP or HTTPS (HTTP/S) 208 and then routes the request as a web service through a web browser located on the HTTP/S PSAP 214. In a text to MSRP PSAP 216 delivery option, the TCC 202 converts a text-to-911 message to a SIP/MSRP 210 and then routes the SIP/MSRP message downstream to the MSRP PSAP 216. Although the system 200 only shows a single TCC, a person skilled in the art would understand that the carrier network typically has several TCCs interconnected to PSAPs.

The disclosed solution enables MSRP messaging support for NG911 with backwards compatibility to text-to-911 messaging as a fallback when NG911 is unavailable. This solution enables devices to access emergency services during the transition from legacy text-to-911 to NG911 or across different locations of a network that support either emergency service. The disclosed embodiments support at least three use case. In a first use case, the network location of a UE supports NG911. As such, the UE can establish a text message session with integrated messaging support NG911. In a second use case, the network location of the UE supports text-to-911 messaging but does not support NG911. The UE can fallback to the text-to-911 service. In the third use case, the network location of the UE does not support NG911 or text-to-911. As a result, the UE receives an error message back from the network to prompt a user of the UE to call 911.

Figure 3:
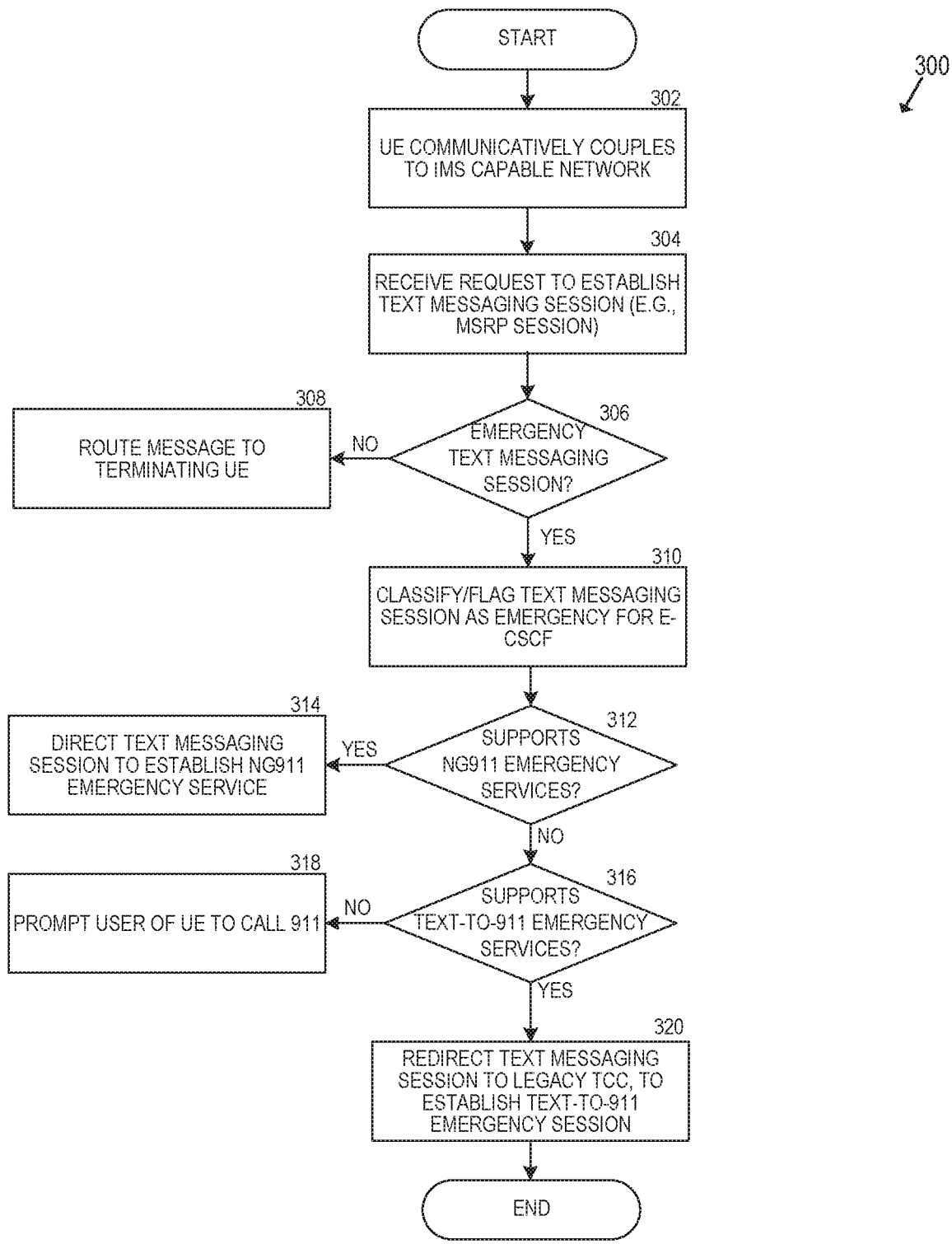
FIG. 3 is a flow diagram that illustrates a process for devices to access next generation 911 (NG911) emergency services while remaining backwards compatible to an interim text-to-911 emergency services.

FIG. 3 is a flow diagram that illustrates a process 300 for devices to access NG911 while remaining backwards compatible to a text-to-911 service and expands upon the above three use cases. In 302, a user equipment (UE) device communicatively couples to an IMS capable network. In 304, the UE requests text message session support on the IMS capable network. For example, the UE can initiate an MSRP session, which originates like a voice call by using SIP procedures that are well-known to persons skilled in the art.

In 306, the P-CSCF of the IMS capable network examines the request for the text message session originating at the UE to determine whether the request is for a normal text message session or an emergency text message session. In 308, when the request is for a normal text message session, the P-CSCF communicates with a S-CSCF and the I-CSCF to route a text message of the normal messaging session to a terminating UE. To perform the routing, the P-CSCF and/or other IMS entities use location and routing information as described with respect to FIG. 1. Thus, when the network location of the UE supports NG911, a node of the IMS capable network can apply routing instructions to ensure that the text message session is directed for routing to an NG911 emergency service.

In 310, when the text message session is an emergency text message session, the P-CSCF classifies or flags that text message session as such and selects an E-CSCF of the IMS capable network to handle the emergency text message session. The E-CSCF communicates with a location server (e.g., LRF, RDF) to retrieve location information of the UE and obtains routing information (e.g., address of the PSAP) for the text message session from one or more entities supporting location services. For example, an IMS entity (e.g., the location server) can perform a lookup procedure in public safety profile information stored at the IMS entity to determine whether the network location of the UE supports NG911 and/or text-to-911 emergency services. For example, the location server can perform a lookup procedure in a public safety profile information database, which maps multiple locations of the IMS capable network to respective capabilities for NG911 or text-to-911. If the current network location of the UE supports NG911 or text-to-911, then a text message session can be established for the UE by using one of those emergency services.

In 312, the location server and/or another node of the IMS network determines whether the network location of the UE supports NG911 emergency services. In 314, the MSRP session is established for NG911 because the location server determined that the network location of the UE supports NG911. The location server provides the routing instructions for the IBCF to route the emergency text message session to the proper node of the IMS capable network. That is, the IBCF decides where the text message session is routed in a manner similar to a voice call as described for FIG. 1. As such, the location server determines whether a network location of the UE supports a native MSRP session in NG911 or whether a fallback legacy TCC is supported. Hence, the UE can still use an original MSRP session request and get to a TCC for a text-to-911 session. In other words, the UE can operate in accordance with standard NG911 procedures and get redirected to a TCC for text-to-911 emergency services.

In 316, the text message session is not established for NG911 because the network location of the UE does not support NG911 emergency services. Instead, the location server determines that the network location of the UE supports text-to-911 emergency services. In 318, the location server determines that the network location of the UE also does not support text-to-911 and, as such, causes communication of a message to the UE, where the communication prompts the user to conduct a 911 voice call because text messaging to the PSAP is not possible.

In 320, the location server determines that the network location of the UE supports text-to-911 emergency services. As such, a fallback procedure is performed to establish a text message session through text-to-911 emergency services. For example, the location server can cause a redirection of a request for an MSRP session to a TCC. As such, the MSRP session is used to connect to a legacy TCC, which can then perform interworking to deliver a text-to-911 message to a suitable PSAP.

Figure 4:
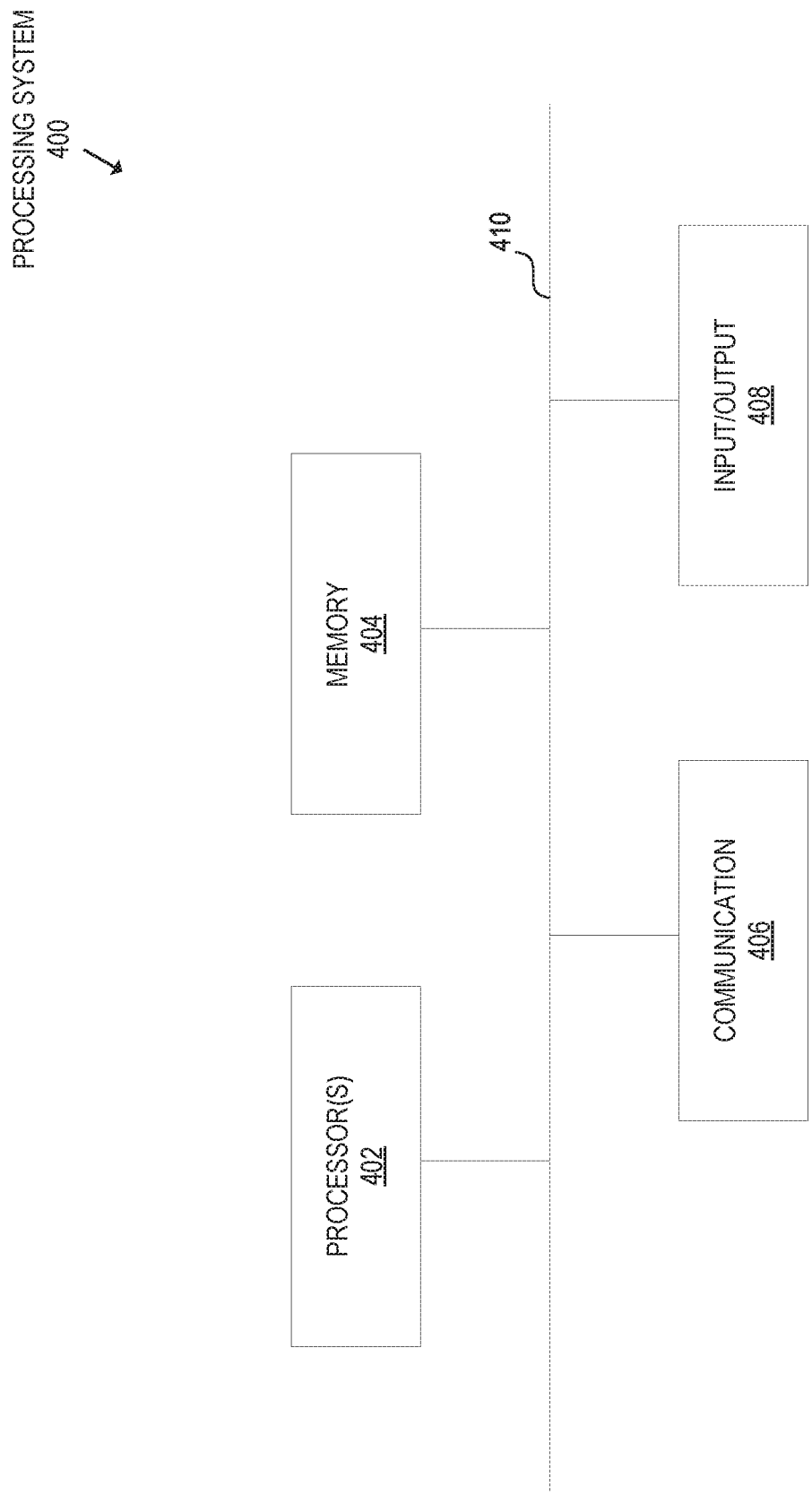
FIG. 4 is a block diagram that illustrates an example processing system in which aspects of the disclosed technology can be embodied.

FIG. 4 is a block diagram illustrating an example of a processing system 400 in which at least some operations described herein can be implemented. The processing system 400 represents a system that can run any of the methods/algorithms described herein. For example, any network access device (e.g., UE) component of an IMS capable network can include or be part of a processing system 400. The processing system 400 can include one or more processing devices, which can be coupled to each other via a network or multiple networks. A network can be referred to as a communication network or telecommunications network.

In the illustrated embodiment, the processing system 400 includes one or more processors 402, memory 404, a communication device 406, and one or more input/output (I/O) devices 408, all coupled to each other through an interconnect 410. The interconnect 410 can be or include one or more conductive traces, buses, point-to-point connections, controllers, adapters and/or other conventional connection devices. Each of the processor(s) 402 can be or include, for example, one or more general-purpose programmable microprocessors or microprocessor cores, microcontrollers, application specific integrated circuits (ASICs), programmable gate arrays, or the like, or a combination of such devices.

The processor(s) 402 control the overall operation of the processing system 400. Memory 404 can be or include one or more physical storage devices, which can be in the form of random-access memory (RAM), read-only memory (ROM) (which can be erasable and programmable), flash memory, miniature hard disk drive, or other suitable type of storage device, or a combination of such devices. Memory 404 can store data and instructions that configure the processor(s) 402 to execute operations in accordance with the techniques described above. The communication device 406 can be or include, for example, an Ethernet adapter, cable modem, Wi-Fi adapter, cellular transceiver, Bluetooth transceiver, or the like, or a combination thereof. Depending on the specific nature and purpose of the processing system 400, the I/O devices 408 can include devices such as a display (which can be a touch screen display), audio speaker, keyboard, mouse or other pointing device, microphone, camera, etc.

While processes or blocks are presented in a given order, alternative embodiments can perform routines having steps or employ systems having blocks, in a different order, and some processes or blocks may be deleted, moved, added, subdivided, combined and/or modified to provide alternative or sub-combinations, or can be replicated (e.g., performed multiple times). Each of these processes or blocks can be implemented in a variety of different ways. In addition, while processes or blocks are at times shown as being performed in series, these processes or blocks may instead be performed in parallel, or can be performed at different times. When a process or step is "based on" a value or a computation, the process or step should be interpreted as based at least on that value or that computation.

Software or firmware to implement the techniques introduced here can be stored on a machine-readable storage medium and can be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM), random-access memory (RAM), magnetic disk storage media, optical storage media, flash memory devices), etc.

Note that any and all of the embodiments described above can be combined with each other, except to the extent that it may be stated otherwise above, or to the extent that any such embodiments might be mutually exclusive in function and/or structure. Although the present invention has been described with reference to specific exemplary embodiments, it will be recognized that the invention is not limited to the embodiments described but can be practiced with modification and alteration within the spirit and scope of the disclosed embodiments. Accordingly, the specification and drawings are to be regarded in an illustrative sense rather than a restrictive sense.

Physical and functional components (e.g., devices, engines, modules, and data repositories) associated with processing system 400 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip. The tangible storage memory can be computer-readable data storage. The tangible storage memory can be volatile or non-volatile memory. In some embodiments, the volatile memory can be considered "non-transitory" in the sense that it is not a transitory signal. Memory space and storage described in the figures can be implemented with the tangible storage memory as well, including volatile or non-volatile memory.

Each of the functional components can operate individually and independently of other functional components. Some or all of the functional components can be executed on the same host device or on separate devices. The separate devices can be coupled through one or more communication channels (e.g., wireless or wired channel) to coordinate their operations. Some or all of the functional components can be combined as one component. A single functional component can be divided into sub-components, each sub-component performing separate method steps or a method step of the single component.

In some embodiments, at least some of the functional components share access to a memory space. For example, one functional component can access data accessed by or transformed by another functional component. The functional components can be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implement a portion of the functional components). Other arrays, systems and devices described above can include additional, fewer, or different functional components for various applications.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively or additionally, network elements performing those functions could be replaced by two or more elements to perform portions of those functions. In addition, while processes, message/data flows, or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes, message/data flows, or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges. Those skilled in the art will also appreciate that the actual implementation of a database can take a variety of forms, and the term "database" is used herein in the generic sense to refer to any data structure that allows data to be stored and accessed, such as tables, linked lists, arrays, etc.

The teachings of the methods and system provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the technology can be modified, if necessary, to employ the systems, functions, and concepts of the various references described above to provide yet further embodiments of the technology.

These and other changes can be made to the invention in light of the above Detailed Description. While the above description describes certain embodiments of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as embodied in a computer-readable medium, other aspects can likewise be embodied in a computer-readable medium. Accordingly, the inventors reserve the right to add additional claims after filing the application to pursue such additional claim forms for other aspects of the technology.

I claim:

1. At least one computer-readable medium, excluding transitory signals and carrying instructions, which when executed by at least one data processor, performs operations to handle a request for an emergency text message session on an IP multimedia subsystem (IMS) capable network, the operations comprising:
   determine a location of a device on the IMS capable network based on received location information;
   identify a capability of the IMS capable network to support NG911 or interim text-to-911 for the device based on public safety profile information;
   when the IMS capable network is capable of supporting the device with NG911, direct the request for the emergency text message session to a NG911 enabled public safety answering point (PSAP); and
   when the IMS capable network is incapable of supporting the device with NG911 and is capable of supporting the device with interim text-to-911, redirect the request for the emergency text message session to a text control center (TCC).

2. The computer-readable storage medium of claim 1, wherein the text message session is a message session relay protocol (MSRP) session.

3. The computer-readable storage medium of claim 1, further comprising:
   performing a lookup procedure in public safety profile information to identify whether the IMS capable network is capable of supporting NG911 or text-to-911 at the location of the device.

4. The computer-readable storage medium of claim 1, wherein the request is for an NG911 emergency service.

5. The computer-readable storage medium of claim 1, further comprising:
   determining that the IMS capable network is capable of supporting the device with interim text-to-911 only after determining that the IMS capable network is incapable of supporting the device with NG911.

6. A computer-implementable method to handle a first request for a first emergency text message session on an IP multimedia subsystem (IMS) capable network, the method comprising:
   determine a location of a first device on the IMS capable network based on received first location information;
   identify a capability of the IMS capable network to support NG911 or interim text-to-911 for the device based on public safety profile information;
   when the IMS capable network is capable of supporting the device with NG911, direct the request for the emergency text message session to a NG911 enabled public safety answering point (PSAP); and
   when the IMS capable network is incapable of supporting the device with NG911 and is capable of supporting the device with interim text-to-911, redirect the request for the emergency text message session to a text control center (TCC).

7. The method of claim 6 further comprising,
   receiving a second request from a second device for a second text message session on the IMS capable network, wherein the second device is at a second location different from a location of the IMS capable network; and
   upon determining that the IMS capable network is capable of supporting NG911 at the second location, establishing the second text message session with a second PSAP of that supports NG911.

8. The method of claim 6 further comprising:
   receiving a second request from a second device for a second text message session on the IMS capable network, wherein the second device is at a second location different from the first location; and
   upon determining that the IMS capable network is incapable of supporting NG911 and incapable of supporting interim text-to-911, communicating a message for to prompt a user of the second device to establish a 911 voice call.

9. The method of claim 6, wherein the first text message session is a message session relay protocol (MSRP) session.

10. The method of claim 6, further comprising:
determining the first location of the first device based on information retrieved from a location server;
identifying a capability of the IMS capable network to support NG911 or interim text-to-911 at the first location based on public safety profile information, wherein the public safety profile information indicates that the first location supports interim text-to-911; and
retrieving routing information for the first text message session to the PSAP that supports text-to-911.

11. The method of claim 6 further comprising:
receiving the first request for the first text message session by a proxy call session control function (P-CSCF) node of the IMS capable network;
classifying the first request for the first text message session as an emergency text message session; and
directing the first request for the first text message session to an emergency call session control function (E-CSCF) node of the IMS capable network.

12. The method of claim 6 further comprising, when the first request for the first text message session is redirected to the TCC:
causing the TCC to interwork the first text message session to any of a TTY-capable PSAP, an HTTP-capable PSAP, and an MSRP-capable PSAP.

13. The method of claim 6 further comprising:
receiving a second request for a second text message session by a proxy call session control function (P-CSCF) node of the IMS capable network;
classifying the second request for the second text message session as a normal text message session; and
routing the second text message session as a normal text message session to a second device on the IMS capable network.

14. The method of claim 6 further comprising, prior to determining whether the IMS capable network supports NG911 or interim text-to-911:
receiving the first request for the first text message session by a proxy call session control function (P-CSCF) node of the IMS capable network;
classifying the first request for the first text message session as an emergency text message session; and
directing the first request for the first text message session to an emergency call session control function (E-CSCF) node of the IMS capable network to retrieve location information of the first device and routing information for the first text message session.

15. The method of claim 6, further comprising:
performing a lookup procedure in a public safety profile information database, which maps multiple locations of the IMS capable network to a respective capability for NG911 or text-to-911.

16. A system for handling a request for an emergency text message session on an IP multimedia subsystem (IMS) capable network, the system comprising:
at least one hardware processor in the IMS capable network; and,
at least one computer-readable memory storing instructions to be executed by the at least one hardware processor, where execution of the instructions cause the system to:
determine a location of a device on the IMS capable network based on received location information;
identify a capability of the IMS capable network to support NG911 or interim text-to-911 for the device based on public safety profile information;
when the IMS capable network is capable of supporting the device with NG911, direct a request for a emergency text message session to a NG911 enabled public safety answering point (PSAP); and
when the IMS capable network is incapable of supporting the device with NG911 and is capable of supporting the device with interim text-to-911, redirect the request for the emergency text message session to a text control center (TCC).

17. The system of claim 16, wherein the request for the emergency text message session is received by a proxy call session control function (P-CSCF) node and is directed by the P-CSCF to an emergency call session control function (E-CSCF) node of the IMS capable network.

18. The system of claim 16, wherein the request is for a message session relay protocol (MSRP) session.

19. The system of claim 16 wherein the instructions further comprise:
when the IMS capable network is incapable of supporting the device with each of NG911 and interim text-to-911, prompt a user of the device to make a 911 voice call.

20. The system of claim 16 wherein the instructions further comprise:
establish a text-to-911 session only after determining that the IMS capable network is incapable of supporting the device with NG911.

* * * * *